UNITED STATES PATENT OFFICE.

HERBERT C. GORE, OF TAKOMA PARK, MARYLAND.

PROCESS FOR MAKING SYRUP FROM CIDER AND OTHER FRUIT-JUICES.

1,141,458.      Specification of Letters Patent.      Patented June 1, 1915.

No Drawing.      Application filed October 7, 1914.     Serial No. 865,436.

(DEDICATED TO THE PUBLIC.)

*To all whom it may concern:*

Be it known that I, HERBERT C. GORE, a citizen of the United States, and an employee of the Department of Agriculture of the said United States, residing at Takoma Park, in the county of Montgomery, State of Maryland, whose postoffice address is Takoma Park, Maryland, have invented a new and useful Process for Making Syrup from Cider and other Fruit-Juices.

This application is made under the Act of March 3, 1883, Chapter 143 (22 Stat., 625), and the invention herein described and claimed may be used by the Government of the United States or any of its officers or employees in the prosecution of work for the United States or by any person in the United States without the payment of any royalty thereon.

My invention relates to a process for preparing syrup from cider and other fruit juices, such as juices from strawberries, oranges, grapes, pears and the like.

In practising my invention I first place cider or the fruit juice in a vat or other suitable receptacle. I then add milk of lime to the cider or other fruit juice in such quantities that the free acid present in the juice is nearly, but not quite, neutralized and simultaneously stir the mixture with the addition of the lime. I so carry out the process that about nine-tenths of the free acids of the cider or other fruit juice are neutralized for two reasons: First, because it is desirable that a slight amount of free acid should remain in the finished product. Second, because it is difficult to obtain milk of lime free from coarse particles of lime, and if the juice is completely neutralized by the milk of lime, these particles will gradually pass into solution rendering the juice alkaline. If the juice thus becomes alkaline, its quality is badly injured.

The next step consists in heating the juice almost or nearly to its boiling point, approximately 212° F. The reason for this step is that coagulation of certain suspended and dissolved substances occurs in such a way that subsequent filtration can be thereby accomplished. If the juice is not heated, it would be difficult to free it from the certain disssolved and suspended matters occurring therein. The juice is then passed through a filter press to remove the suspended substances. While I prefer a filter press, any other device for accomplishing the separation of the coagulated substances from the juice may be employed. By adding a small amount, less than one per cent. of infusorial earth to the juice, subsequent to its treatment with milk of lime and its subjection to heating, but before filtering, causes the filtration to proceed with much greater ease. I find that filtration may be carried on without using this material if so desired. I prefer, however, to use it as the infusorial earth greatly facilitates filtration. After the removal of the suspended matter in the manner described, I subject the solution to concentration. Any suitable evaporator may be employed, such as a steam jacketed kettle, a vat provided with steam coils, or a continuous evaporator. Upon thus concentrating, a syrup possessing an attractive color and flavor is formed together with calcium malate, which separates in the syrup while concentrating in the form of crystals and which further separates upon the cooling of the syrup. The boiling point of the syrup at the time when it is filtered or finally concentrated is about 223° F.

The last and final step in my process consists in passing the syrup and crystals through a filter press to separate them. The syrup can then be treated by known means. I prefer to heat it nearly to the boiling point and pour, while hot, into containers in which it may be sealed. When so prepared it will keep indefinitely.

The crystals can be washed with water to free them from the adhering syrup, and if desired, can be further purified and worked up in various well-known ways.

I do not confine myself exclusively to the use of milk of lime for neutralizing the free acid in the cider. I find that calcium carbonate may also be employed as a neutralizing agent. However, I prefer milk of lime because I find by practice that the free acid in the juice can be neutralized more completely than by calcium carbonate.

I do not confine my process to the manufacture of syrup exclusively from cider, but this process may be employed in the manufacture of syrup from juices of other fruits such as strawberries, oranges, grapes, pears, and the like. In making syrup from fruit juices other than cider I follow the same process as I employ in the manufacture from cider. In case these fruit juices contain citric or tartaric acids, I find that their calcium salts separate upon liming and heating to boiling, and are nearly all removed from the fruit juice at this stage of the operation. Malic acid, if present, in sufficient quantities will appear in the form of its calcium salt in the finished syrup.

Having thus described my invention, I claim:

1. A process for making syrup from fruit juices, consisting in adding a neutralizing agent to the juice, agitating the solution and heating it, subjecting the heated solution to filtration, then concentrating the filtered solution and removing therefrom salts of the corresponding organic acids formed from the action of the neutralizing agent on the fruit juice, substantially as described.

2. A process for making syrup from fruit juices, consisting in adding a neutralizing agent to the juice, agitating the juice simultaneously with the addition of the neutralizing agent, heating the agitated solution to a boiling temperature, then subjecting the solution to filtration for removing suspended matter contained therein, evaporating the residue and then passing the solution through a filter press for separating from the syrup salts of the corresponding organic acids formed from the action of the neutralizing agent on the fruit juice from the syrup, substantially as specified.

3. A process for making syrup from fruit juices, consisting in adding milk of lime to the juice and simultaneously stirring the juice, then heating the solution to a temperature of 212° F., and subjecting the heated solution to filtration for removing therefrom suspended matter, evaporating the solution for separating into crystals the calcium malate contained therein, and finally passing the mixture through a filter press for separating the crystalline calcium malate, substantially as specified.

4. A process for making syrup from fruit juices, consisting in adding milk of lime to the juice in amount not sufficient completely to neutralize the acidity of the juice, agitating the solution and heating it, subjecting the heated solution to filtration, then concentrating the filtered solution and removing therefrom salts of the corresponding organic acids formed from the action of the milk of lime on the fruit juice, substantially as described.

In testimony whereof I affix my signature in the presence of two subscribed witnesses.

HERBERT C. GORE.

Witnesses:
JAMES B. HORIGAN,
HARRY GODING.